(12) United States Patent
Swisher (10) Patent No.: US 11,952,319 B2
(45) Date of Patent: Apr. 9, 2024

(54) SELECTING AND APPLYING METAL OXIDES AND CLAYS FOR PLANT GROWTH

(71) Applicant: PHOSPHOLUTIONS LLC, State College, PA (US)

(72) Inventor: Hunter Swisher, St. Petersburg, FL (US)

(73) Assignee: PHOSPHOLUTIONS INC., State College, PA (US)

(*) Notice: Subject to any disclaimer, the term of this patent is extended or adjusted under 35 U.S.C. 154(b) by 816 days.

(21) Appl. No.: 17/040,628

(22) PCT Filed: Mar. 26, 2019

(86) PCT No.: PCT/US2019/024010
§ 371 (c)(1),
(2) Date: Sep. 23, 2020

(87) PCT Pub. No.: WO2019/191050
PCT Pub. Date: Oct. 3, 2019

(65) Prior Publication Data
US 2021/0114947 A1     Apr. 22, 2021

Related U.S. Application Data

(60) Provisional application No. 62/648,066, filed on Mar. 26, 2018.

(51) Int. Cl.
*C05B 17/00* (2006.01)
*A01G 24/12* (2018.01)
(Continued)

(52) U.S. Cl.
CPC .............. *C05B 17/00* (2013.01); *A01G 24/12* (2018.02); *A01G 24/40* (2018.02); *C02F 1/283* (2013.01); *C02F 2101/105* (2013.01)

(58) Field of Classification Search
CPC ........ C05B 17/00; A01G 24/12; A01G 24/40; C02F 1/283; C02F 2101/105;
(Continued)

(56) References Cited

U.S. PATENT DOCUMENTS 4,927,447 A    5/1990   Youssef et al.
5,693,199 A    12/1997   Lynch et al.
(Continued)

FOREIGN PATENT DOCUMENTS

CN     105771916 A    7/2016
CN     107185479 A    9/2017
(Continued)

OTHER PUBLICATIONS

Wang, Lili, Keith A. Fields, and Abraham SC Chen. Arsenic removal from drinking water by ion exchange and activated alumina plants. National Risk Management Research Laboratory, Office of Research and Development, US Environmental Protection Agency, p. 42, 2000. (Year: 2000).*

(Continued)

*Primary Examiner* — Jennifer A Smith
(74) *Attorney, Agent, or Firm* — McNees Wallace & Nurick LLC (57) ABSTRACT

A process of plant fertilization includes adsorbing phosphorus from an anthropogenic phosphorus source onto a plurality of particles of phosphorus adsorbent and then applying the plurality of particles of phosphorus adsorbent to a plant medium. A composition includes a soil amendment and a plant medium. The soil amendment includes a plurality of particles of phosphorus adsorbent and phosphorus from an anthropogenic phosphorus source adsorbed onto the particles. A process includes adsorbing a first amount of phosphorus from a phosphorus source onto a plurality of particles of phosphorus adsorbent to saturate the particles of phos- (Continued)

phorus adsorbent with phosphorus. The process also includes processing the particles to maintain the first amount of phosphorus on the particles and permit additional adsorption of phosphorus onto the particles. The process further includes adsorbing an additional amount of phosphorus from the phosphorus source onto the particles to saturate the particles with phosphorus.

20 Claims, 4 Drawing Sheets

(51) Int. Cl.
*A01G 24/40* (2018.01)
*C02F 1/28* (2023.01)
*C02F 101/10* (2006.01)

(58) Field of Classification Search
CPC ............ C02F 2103/001; C02F 1/287; C02F 2103/007; C02F 2103/10; C02F 2103/20
See application file for complete search history.

(56) References Cited

U.S. PATENT DOCUMENTS

| | | |
|---|---|---|
| 6,287,357 B1 | 9/2001 | Lynch et al. |
| 7,485,171 B2 | 2/2009 | Lynch et al. |
| 2017/0259243 A1 | 9/2017 | Lyngsie et al. |

FOREIGN PATENT DOCUMENTS

| | | |
|---|---|---|
| DE | 102013104483 A1 | 5/2014 |
| KR | 20000070007 A * | 11/2000 |

OTHER PUBLICATIONS

Huber. "COMPALOX ON/V-801" Martinswerk GmbH. Jul. 2017 (Year: 2017).*
Volesky, Boya "Phosphorus" Everglades HUB. Mar. 10, 2014 (Year: 2014).*
Gorrell, "Classification of Formation Waters Based on Sodium Chloride Content", Bulletin of the American Association of Petroleum Geologists, vol. 42, p. 2513 (1958).
Malavipathirana et al., "Value Addition to Waste Material Supported by Removal of Available Phosphate from Simulated Brackish Water—A Low Cost Approach", Journal of Geoscience and Environment Protection, vol. 1, pp. 7-12 (2013).
Martinswerk GmbH, "Compalox®: Albemarle®: Activated Aluminum Oxide for the adsorption of harmful substances", 4 pages, retrieved from https://www.hubermaterials.com/userfiles/files/product-finder/saleslit/Compalox%20Activated%20Aluminum%20Oxide%20for%20the%20Adsorption%20of%20Harmful%20Substances.pdf on May 9, 2019.
Wang et al., "Adsorption Capacity for Phosphorus Comparison among Activated Alumina, Silica Sand and Anthracite Coal", Journal of Water Resource and Protection, vol. 4, pp. 260-264 (2009).
Search Report issued to European counterpart Application No. 19774427.9 dated Nov. 24, 2021.

* cited by examiner

SELECTING AND APPLYING METAL OXIDES AND CLAYS FOR PLANT GROWTH

CROSS-REFERENCE TO RELATED APPLICATIONS

This application claims priority to and the benefit of U.S. Provisional Application No. 62/648,066 filed Mar. 26, 2018, which is hereby incorporated by reference in its entirety.

FIELD OF THE INVENTION

This application is directed to the fields of water remediation and plant fertilization. More specifically this application is directed to phosphorus remediation from aqueous systems and application of that phosphorus for plant fertilization and growth.

BACKGROUND OF THE INVENTION

Current human phosphorus use is unsustainable for the devastation it causes aquatic ecosystems throughout the world's most important waterways. Additionally, by one estimate, the global phosphorus reserves will be depleted in less than 300 years based on the current removal rate of phosphorus.

Phosphorus is vital for plant growth and is essential for aiding in photosynthesis, respiration, energy storage and transfer, cell division, and cell enlargement. Fifty million tons of phosphorus is applied globally each year as fertilizer at a cost of about $76 billion (U.S.), but research shows that current processes are highly inefficient, with more than 60% of that phosphorus being washed away before ever being used. Phosphorus is the second largest nutrient applied for food production, and the need to better utilize this critical resource has never been greater. While phosphorus is necessary for plants to grow, too much or too little of phosphorus in plant media can harm plant growth. Therefore, it is advantageous for a fertilizer to provide a continuous, yet controlled, supply of available phosphorus to plant media so plants can uptake adequate phosphorus as needed, but limit the amount of phosphorus applied from being wasted due to leaching or being tied up in unavailable forms within the plant media.

Improved retention in fertilizer applications would significantly reduce the quantity of phosphorus needed and reduce the environmental impact caused by phosphorus loads being discharged into aquatic ecosystems. Some forms of fertilizers are considered buffered fertilizers. Those buffered fertilizers include a controlled release mechanism by utilizing the ionic exchange characteristics of metal oxides. The ability of metal oxides, specifically activated alumina, to buffer phosphorus after being applied to plant media based on plant uptake has already proved to be effective.

Other historical human uses of phosphorus include in soaps and laundry detergent, although these are now typically banned ingredients. Sixty-two million tons of phosphorus is discharged into the environment globally from anthropogenic sources each year. The presence of even a very low concentration of phosphorus in an aqueous system may lead to an algae outbreak in that system, and ultimately eutrophication, which may be devastating to the plant and animal life found in that system. The United States alone spends an estimated $5 billion (U.S.) annually cleaning up phosphorus pollution and there has been an increasing need for innovation in this space to clean it up more efficiently.

BRIEF DESCRIPTION OF THE INVENTION

Exemplary embodiments are directed to methods of selecting and applying phosphorus adsorbents to plant media in order to facilitate plant growth, plant fertility, and/or plant health. The physical properties of certain materials, such as, for example, metal oxides and/or clays, allow for the adsorption and desorption of phosphorus, a vital macronutrient for plants. Therefore, metal oxides, clays and/or other phosphorus adsorbents may be applied to plant media in order to manipulate the availability and retention of phosphorus in plant media. The ability to manipulate phosphorus availability in plant media may increase root mass, root hair development, and overall root depth. By facilitating root growth, root depth, and/or root mass, the methods may promote plant durability and plant health. Furthermore, the methods may include a system in which phosphorus adsorbents are applied to aqueous solutions containing phosphorus in order for the phosphorus of the solution to be recycled, in part, for plant fertilization.

Exemplary embodiments employ a phosphorus adsorbent to capture and reapply the phosphorus to fertilize plants for improved plant growth and in the process reducing the negative environmental impact of phosphorus use.

In an embodiment, a process of plant fertilization includes adsorbing phosphorus from an anthropogenic phosphorus source onto a plurality of particles of at least one phosphorus adsorbent and then applying the plurality of particles of phosphorus adsorbent to a plant medium.

In another embodiment, a composition includes a soil amendment and a plant medium. The soil amendment includes a plurality of particles of at least one phosphorus adsorbent and phosphorus from an anthropogenic phosphorus source adsorbed onto the particles.

In another embodiment, a process includes adsorbing a first amount of phosphorus from a phosphorus source onto a plurality of particles of at least one phosphorus adsorbent to saturate the plurality of particles of phosphorus adsorbent with phosphorus. The process also includes processing the particles to maintain the first amount of phosphorus on the particles and permit additional adsorption of phosphorus onto the particles. The process further includes adsorbing an additional amount of phosphorus from the phosphorus source onto the particles to saturate the particles with phosphorus.

Other features and advantages of the present invention will be apparent from the following more detailed description of exemplary embodiments that illustrate, by way of example, the principles of the invention.

DETAILED DESCRIPTION OF EXEMPLARY EMBODIMENTS

Processes of the present disclosure include selecting the material and/or particle size of a phosphorus adsorbent, adsorbing phosphorus onto a phosphorus adsorbent, processing a phosphorus adsorbent to permit additional adsorption of phosphorus, and/or applying the phosphorus adsorbent to plant media. Processing the phosphorus adsorbent may include drying and/or rinsing the phosphorus adsorbent. Applying the phosphorus adsorbent to plant media may include mixing, blending, top-dressing, injecting, and/or banding. Compositions of the present disclosure include a phosphorus adsorbent. In some embodiments, the phosphorus adsorbent collects phosphorus from an anthropogenic phosphorus source and is subsequently applied to release the phosphorus in a plant medium as fertilizer.

In some embodiments, the phosphorus adsorbent is or includes at least one metal, typically in oxide form. Metals include, but are not limited to, aluminum, iron, calcium, magnesium, and titanium. In some embodiments, the adsorbent is or includes activated alumina, activated iron oxide, activated bauxite, activated clay, activated kaolin, or a combination thereof. In some embodiments, the adsorbent is selected as a waste or scrap source from a process of making metal oxide adsorbents, catalysts, reagents, abrasives, or desiccants for other commercial applications to reduce cost. Although the term "phosphorus" is used herein, it is to be understood that the form of the phosphorus being adsorbed and released is predominantly orthophosphate.

Metal adsorbents are typically refined and processed from naturally-occurring and readily-available minerals. A manufacturing process typically requires the naturally-occurring and readily-available raw materials to be mined and refined into the form of metal hydrates. The metal hydrates are then activated through a calcination step, producing the desired chemi-adsorptive qualities. Calcination is the process of high thermal treatment in an oxygen-rich environment to remove chemically-bound water. When chemically-bound water is removed from a metal hydrate, the chemical structure changes and the particle develops pore spaces where water once occupied. Inside these pore spaces, electrically-charged binding sites remain that allow for a semi-quasi chemi-adsorption to occur with heavily-charged ions such as phosphate. The chemi-adsorptive characteristic of the binding sites, both cationic and anionic in nature, allow for ions like phosphate to eventually be desorbed back into solution through equilibrium kinetics (see, for example, U.S. Pat. Nos. 5,693,119, 6,287,357, and 7,485,171, which are hereby incorporated by reference herein).

The solid-phase activated alumina utilized as a phosphorus adsorbent may be a form of aluminum oxide or a more purified form thereof. Activated alumina maintains various physical properties, but in general, activated alumina is a porous, granular, and/or pelleted product. Activated alumina may also be referred to as "activated alumina particles" and the terms are used interchangeably herein. These features may be distinguished from other forms of alumina, such a gel alumina or smelter-grade alumina. Solid-phase activated alumina may be made more reactive, thus increasing the capacity to adsorb phosphorus, by treating the alumina with an acid, such as HCl or $HPO_4$. The solid-phase activated alumina may be treated with a base, such as NaOH or KOH to increase the desorption rate of phosphorus.

In some embodiments, activated alumina particles can be selected for based on the percentage of aluminum oxide in the activated alumina particles. For example, activated alumina particles can be selected for based on including at least about: 80%, 85%, 90%, 95%, or 100% aluminum oxide. Alternatively, activated alumina particles can be selected for based on including about: 80%-85%, 80%-90%, 80%-95%, 80%-100%, 85%-90%, 85%-95%, 85%-100%, 90%-95%, 90%-100%, or 95%-100% aluminum oxide.

In some embodiments, the metal oxides include metals such as aluminum, iron, magnesium, calcium, or titanium in hydrate or oxide form. In some embodiments, the metal oxide is activated aluminum oxide (alumina). Alternative substrates that naturally contain a mixture of metal oxides and are less refined and/or less processed may be selected, in part, to drastically reduce the material cost. In some embodiments, the precursor to manufacture of the phosphorus adsorbent is a bauxite ore, which is composed of about 70% aluminum oxide, by weight, and contains smaller amounts of iron, magnesium, and titanium oxides. Bauxite may be activated in a manner similar to aluminum oxide activation to form a porous adsorbent material with a slightly lower adsorption capacity, but with a much greater available supply at a much lower raw material cost.

In some embodiments, the phosphorus adsorbent includes a mixture of one or more metal oxides or a fusion of more than one metal oxide. A fusion of metal oxides refers to more than one metal oxide of choice being smelted together, either physically or chemically, to produce a stable product consisting of more than one metal, aluminum and iron, for example. In some embodiments, a fusion composition may be selected based on the relative phosphorus adsorption capabilities and material cost of the fusion composition.

The clay utilized as a phosphorus adsorbent may include the mineral kaolinite. The mineral kaolinite is aluminum silicate hydroxide and has the chemical formula $Al_2\ Si_2O_5(OH)_4$. Kaolin, also known as China clay, consists primarily of the mineral kaolinite. Therefore, kaolin may also be referred to as aluminum silicate hydroxide or by the chemical formula $Al_2\ Si_2O_5(OH)_4$. Generally, kaolin is in the form of fine, granular particles. For purposes of the present disclose, "clay" may also be referred to as "kaolin", and the terms are used interchangeably herein.

In some embodiments, the particle size of the phosphorus adsorbent material is selected for implementation in plant media in order to manipulate phosphorus availability. The improvement of plant growth for plant species may be achieved while also preventing excess leaching of phosphorus.

Before the phosphorus adsorbent is applied to the plant media, adsorbent particles of appropriate sizes may be collected by a particle filtration scheme. In some embodiments, the particle filtration scheme includes at least one sieve or any type of meshed screen where solid adsorbent can be administered to the sieve so that the adsorbent can be separated by particle size. The openings of the sieve can range in various sizes, including but not limited to at least about: 0.037 mm (Tyler Equivalent 400 Mesh), 0.044 mm (Tyler Equivalent 325 Mesh), 0.053 mm (Tyler Equivalent 270 Mesh), 0.063 mm (Tyler Equivalent 250 Mesh), 0.074 mm (Tyler Equivalent 200 Mesh), 0.088 mm (Tyler Equivalent 170 Mesh), 0.105 mm (Tyler Equivalent 150 Mesh), 0.125 mm (Tyler Equivalent 115 Mesh), 0.149 mm (Tyler Equivalent 100 Mesh), 0.177 mm (Tyler Equivalent 80 Mesh), 0.210 mm (Tyler Equivalent 65 Mesh), 0.250 mm (Tyler Equivalent 60 Mesh), 0.297 mm (Tyler Equivalent 48 Mesh), 0.354 mm (Tyler Equivalent 42 Mesh), 0.420 mm (Tyler Equivalent 35 Mesh), 0.500 mm (Tyler Equivalent 32 Mesh), 0.595 mm (Tyler Equivalent 28 Mesh), 0.707 mm (Tyler Equivalent 24 Mesh), 0.841 mm (Tyler Equivalent 20 Mesh), 1.00 mm (Tyler Equivalent 16 Mesh), 1.19 mm (Tyler Equivalent 14 Mesh), 1.41 mm (Tyler Equivalent 12 Mesh), 1.68 mm (Tyler Equivalent 10 Mesh), 2.00 mm (Tyler Equivalent 9 Mesh), 2.38 mm (Tyler Equivalent 8 Mesh), 2.83 mm (Tyler Equivalent 7 Mesh), 3.36 mm (Tyler Equivalent 6 Mesh), 4.00 mm (Tyler Equivalent 5 Mesh), 4.76 mm (Tyler Equivalent 4 Mesh), 5.66 mm (Tyler Equivalent 3.5 Mesh), 6.73 mm (Tyler Equivalent 3 Mesh), 8.00 mm (Tyler Equivalent 2.5 Mesh) or more. A person skilled in the art may recognize that other sieve sizes may be used. Alternatively, phosphorus adsorbent can also have an average bulk density in the range of, but not limited to, 0.5 g/cm$^3$ to 1.0 g/cm$^3$.

In some embodiments, two sieves of different mesh sizes may be placed on top of one another, where the sieve with the larger mesh size can be placed on top of the sieve with the smaller mesh size. Thereby, phosphorus adsorbent particles of different sizes can be poured onto the top sieve at which the smaller sized adsorbent particles pass through to the bottom sieve. As a result, specific sizes of adsorbent particles can be selected for. The sizes of adsorbent particles that can be selected for can range from various diameters, including, but not limited to, approximately 0.01 mm to approximately 4.8 mm or more in diameter.

In some embodiments, a sieve with a mesh size of 2.38 mm (Tyler Equivalent 8 Mesh) and a sieve with a mesh size of 1.19 mm (Tyler Equivalent 14 Mesh) can be used together to collect phosphorus adsorbent particles. Thereby, adsorbent particles can be collected at sizes between approximately 1.19 mm in diameter and approximately 2.38 mm in diameter. In some embodiments, adsorbent particles with sizes at or between approximately 1.19 mm in diameter and approximately 2.38 mm in diameter can be applied to plant media that can be used for turf and/or ornamental plants such as cannabis, because relatively larger particle sizes are relatively heavy and easy to administer to the plant media that can be used for such plants.

In some embodiments, a sieve with an opening of 1.19 mm (Tyler Equivalent 14 Mesh) and a sieve with an opening of 0.297 mm (Tyler Equivalent 48 Mesh) can be used together to collect phosphorus adsorbent particles. Thereby, adsorbent particles can be collected at sizes at or between approximately 0.297 mm in diameter and approximately 1.19 mm in diameter. Phosphorus adsorbent particles with sizes at or between approximately 0.297 mm in diameter and approximately 1.19 mm in diameter can be applied to the plant media used for any field grown plants and trees and can include, but is not limited to, plant media that can be used for crops, vegetables, and/or forestry purposes, because the collection of relatively lighter and smaller particle sizes can allow for a higher affinity for adsorbing phosphorous.

In some embodiments, the phosphorus adsorbent particles are provided as a waste product from another manufacturing process, where the provided particles have a particle size of less than 1.19 mm. The provided phosphorus adsorbent particles are then applied to a sieve with an opening of 0.297 mm to remove particles passing through the sieve, with the remaining particles being used as the phosphorus adsorbent.

Once the particle size or sizes of phosphorus adsorbent have been selected, adsorbent particles can be applied to plant media in such a way that results in at least about: 1%, 5%, 10%, 15%, 20%, 25%, 30%, 35%, 40%, 45%, 50%, 55%, 60% or more reduction of adsorbent particles applied to the plant media, where a proportion of adsorbent particles are of a smaller size. Alternatively, the percentage of reduction of adsorbent applied to the plant media may exist in ranges, including but not limited to, at least about: 1%-5%, 1%-10%, 1%-15%, 1%-20%, 1%-25%, 1%-30%, 1%-35%, 1%-40%, 1%-45%, 1%-50%, 1%-55%, 1%-60%, 5%-10%, 5%-15%, 5%-20%, 5%-25%, 5%-30%, 5%-35%, 5%-40%, 5%-45%, 5%-50%, 5%-55%, 5%-60%, 10%-15%, 10%-20%, 10%-25%, 10%-30%, 10%-35%, 10%-40%, 10%-45%, 10%-50%, 10%-55%, 10%-60%, 15%-20%, 15%-25%, 15%-30%, 15%-35%, 15%-40%, 15%-45%, 15%-50%, 15%-55%, 15%-60%, 20%-25%, 20%-30%, 20%-35%, 20%-40%, 20%-45%, 20%-50%, 20%-55%, 20%-60%, 25%-30%, 25%-35%, 25%-40%, 25%-45%, 25%-50%, 25%-55%, 25%-60%, 30%-35%, 30%-40%, 30%-45%, 30%-50%, 30%-55%, 30%-60%, 35%-40%, 35%-45%, 35%-50%, 35%-55%, 35%-60%, 40%-45%, 40%-50%, 40%-55%, 40%-60%, 45%-50%, 45%-55%, 45%-60%, 50%-55%, 50%-60%, 55%-60% or more reduction of adsorbent, where a proportion of adsorbent particles are of a smaller size.

The particle filtration scheme can also be effective in reducing airborne particulate matter, such as dust, that may result from applying phosphorus adsorbent particles to plant media. Airborne particulate matter can be problematic for at least two reasons. First, airborne particulate matter, such as dust, is harmful to inhale. Second, airborne particulate matter that originates from adsorbent can result in a loss of product. However, these potential problems can be avoided by applying adsorbent particles to a particle filtration scheme that involves at least one sieve of mesh-like screen. Therefore, the ability to collect different particle sizes can result in the reduction of airborne particulate matter, including but not limited to, at least about: 1%, 5%, 10%, 15%, 20%, 25%, 30%, 35%, 40%, 45%, 50%, 55%, 60% or more of less airborne particulate matter of adsorbent, where a proportion of adsorbent particles are of a smaller size. Alternatively, the ability to collect different particle sizes can also result in the reduction of airborne particulate matter, including but not limited to, at least about: 1%-5%, 1%-10%, 1%-15%, 1%-20%, 1%-25%, 1%-30%, 1%-35%, 1%-40%, 1%-45%, 1%-50%, 1%-55%, 1%-60%, 5%-10%, 5%-15%, 5%-20%, 5%-25%, 5%-30%, 5%-35%, 5%-40%, 5%-45%, 5%-50%, 5%-55%, 5%-60%, 10%-15%, 10%-20%, 10%-25%, 10%-30%, 10%-35%, 10%-40%, 10%-45%, 10%-50%, 10%-55%, 10%-60%, 15%-20%, 15%-25%, 15%-30%, 15%-35%, 15%-40%, 15%-45%, 15%-50%, 15%-55%, 15%-60%, 20%-25%, 20%-30%, 20%-35%, 20%-40%, 20%-45%, 20%-50%, 20%-55%, 20%-60%, 25%-30%, 25%-35%, 25%-40%, 25%-45%, 25%-50%, 25%-55%, 25%-60%, 30%-35%, 30%-40%, 30%-45%, 30%-50%, 30%-55%, 30%-60%, 35%-40%, 35%-45%, 35%-50%, 35%-55%, 35%-60%, 40%-45%, 40%-50%, 40%-55%, 40%-60%, 45%-50%, 45%-55%, 45%-60%, 50%-55%, 50%-60%, 55%-60% or more of less airborne particulate matter of adsorbent, where a proportion of the adsorbent particles are of a smaller size.

After selection of phosphorus adsorbent particles, the particles can be added to different plant media, in addition to soil amendment and fertilizer products, plant products, and/or fertilizer products. Appropriate plant media and/or products that can have the selected adsorbent incorporated may include, but are not limited to, soil mixes, including, but not limited to, peat, coco coir, recycled paper, bark, compost, vermiculite, perlite, sand, zeolites, clays, and/or top soil. Additional products or amendments include granular fertilizer, organic fertilizer, micronutrient fertilizer, calcium amendments, bone meal, fish emulsion, divot mixes, and/or root zone mixes for turf, agronomic, ornamental, or other plant growth needs.

In some embodiments, the phosphorus adsorbent is used as a soil amendment to adsorb and control the release of phosphorus as the phosphorus is applied separately over time to reduce leaching and improve plant uptake. The phosphorus adsorbent being used as a soil amendment may also adsorb phosphorus naturally occurring in the plant media to reduce leaching and improve plant uptake. Lastly, the phosphorus adsorbent may be used to increase the saturation point for phosphorus-saturated soil, which is common in areas where excess manure is applied over time from high-density animal production. Additional benefits stem from managing phosphorus more efficiently in the soil, such as, for example, increased root development, improved stress tolerance, and greater yields. The phosphorus adsorbent can be applied as a soil amendment or incorporated into a fertilizer blend, a soil mix, or a specialty product line as a value-add component. The soil amendment may be provided to the soil unloaded, partially pre-loaded with phosphorus, or highly pre-loaded with phosphorus.

Within the turf and ornamental industry, phosphorus is typically abundant in the soil and allows for the soil amendment to be more cost effective when applied in an unloaded state to simply soak up and control what is already available in the soil. In other embodiments, the soil amendment may be pre-loaded with phosphorus by a method described in U.S. Pat. No. 6,287,357 or in U.S. Pat. No. 7,485,171, both of which are hereby incorporated by reference herein.

Further developments have been made to the manufacturing process for pre-loading a soil amendment including a phosphorus adsorbent with phosphorus. In some embodiments, the process includes selecting the most cost-effective source of phosphorus to pre-load the greatest quantity of phosphorus onto the adsorbent material, improving the loading protocol, and improving the chemistry of the final product for releasing the phosphorus back into the soil at a rate needed by specific crops. Sources of phosphorus for pre-loading the phosphorus adsorbent include varying concentrations of, but are not limited to, phosphoric acid, monoammonium phosphate (MAP), diammonium phosphate (DAP), monopotassium phosphate (MKP), dipotassium phosphate (DKP), or triple superphosphate (TSP). The source of phosphorus for pre-loading the phosphorus adsorbent may include a mixture of one or more phosphorus sources to increase or decrease the amount of phosphorus loaded onto the phosphorus adsorbent, alter the pH of the loaded phosphorus adsorbent, and/or reduce costs associated with loading the phosphorus adsorbent. Sources of phosphorus for pre-loading the phosphorus adsorbent may be used to include additional plant nutrients such a nitrogen, potassium, iron, and other micronutrients needed for plant growth. To pre-load the phosphorus adsorbent before being used as a soil amendment, one or more of these other sources of phosphorus may be used in conjunction or addition to anthropogenic phosphorus sources.

In some embodiments, the loading capacity of the phosphorus adsorbent, which is the maximum weight of phosphorus adsorbed from a known aqueous solution at a constant flow rate, is increased significantly by allowing the adsorbent to dry out after it approaches or reaches its initial loading capacity. In some embodiments, the drying is for a period of at least 12 hours, alternatively 12 to 24 hours, alternatively at least 24 hours, or any value, range, or sub-range therebetween. Re-exposure of the adsorbent to an aqueous phosphorus source after drying permits an additional adsorption loading of phosphorus beyond the initial loading capacity of the adsorbent. Without wishing to be bound by theory, it is believed that allowing the adsorbent to dry out over a duration of time permits the phosphorus within the aqueous solution to diffuse deeper within the pore spaces, allowing more phosphorus to be adsorbed on the surface of the phosphorus adsorbent.

In some embodiments, when the aqueous phosphorus source contains a moderate to high level of salt and is brackish in nature, such as, for example, effluent water in aquaculture production, the high concentration of salts, such as, for example, sodium salts, decreases adsorption capacity due to the salts interfering with the adsorption occurring on the surface and within pore spaces of the phosphorus adsorbent where phosphorus is bound. In some embodiments, the brackish aqueous phosphorus source has a sodium content of at least 100 parts-per-million (ppm), alternatively at least 250 ppm, alternatively at least 500 ppm, alternatively at least 750 ppm, or alternatively at least 1000 ppm. Rinsing the adsorbent with fresh water flushes the salts without flushing most of the already adsorbed phosphorus, thereby clearing the pore spaces for increased adsorption capacity and continued phosphorus removal by adsorption by the adsorbent.

In some embodiments, the phosphorus for pre-loading of the phosphorus adsorbent comes from an anthropogenic phosphorus source. In some embodiments, the anthropogenic phosphorus source is an anthropogenic pollution source. In some embodiments, the anthropogenic phosphorus source is an anthropogenic remediation source. In some embodiments, the anthropogenic source is an aqueous solution being discharged into the environment, either directly or indirectly, and can legally require treatment before discharge occurs. Appropriate anthropogenic phosphorus sources may include, but are not limited to, storm water, wastewater, agricultural runoff, canal water, retention ponds, manure lagoons, aquaculture effluent, effluent from phosphate mining and processing, or another industrial effluent where phosphorus may be present. A phosphorus adsorbent may also be used to treat bodies of water where anthropogenic phosphorus sources ultimately end up including, but are not limited to, lakes, ponds, rivers, canals, and dams.

In some embodiments, a remediation process targets one or more specific anthropogenic phosphorus sources being discharged into the environment. The same or similar phosphorus adsorbents may be used to remove phosphorus from various sources of pollution. The adsorbents are non-soluble, solid-phase substrates that filter phosphorus-rich solutions and adsorb phosphates from solution as they come in contact with the adsorbent material over time. Targeted anthropogenic sources of phosphorus may include, but are not limited to, storm water, wastewater, agricultural runoff, canal water, retention ponds, manure lagoons, aquaculture effluent, or industrial effluent, such as, for example, from phosphate mining and processing. These treatment applications may involve still/stagnant water, flowing water, or a secondary treatment. Still/stagnant sources include water that has little to no movement to it such as, for example, ponds, lagoons, or lakes. Flowing water sources include any solution that has significant movement such as, for example, storm water, rivers, or canal water. Secondary treatment sources require a primary treatment to remove contaminants or solids that interfere with adsorption potential such as, for example, agricultural runoff, industrial effluent, manure, or wastewater. As the name implies, solutions to remove phosphorus are implemented as a secondary treatment, or polishing step, that is intended to capture the remaining dissolved phosphorus not captured by the primary treatment technology. Each type of treatment application may require a slightly different implementation strategy.

Ultimately, capturing much of the sixty-two million tons of phosphorus annually being discharged into the environment and re-applying it back into production to try to replace as much as possible of the fifty million tons of phosphorus applied as fertilizer every year would reduce the global dependency on the finite phosphorus reserves currently being depleted at an alarming rate. In such embodiments, the same phosphorus adsorbent or adsorbents that capture phosphorus from sources of pollution may deliver the phosphorus to locations where the phosphorus is needed as fertilizer. The adsorbent acts as a carrier to capture and recycle phosphorus from phosphorus-rich solutions and deliver it to the soil where it is released at a controlled rate shown to reduce up to 88% of the phosphorus from leaching back into the environment.

In some embodiments, a water filtration system provides adequate contact time between the phosphorus source and the phosphorus adsorbent, which allows the phosphorus to be adsorbed onto the phosphorus adsorbent and ultimately used for plant fertilization. By adding the phosphorus adsorbent to water containing phosphorus, the phosphorus adsorbent becomes loaded by the phosphorus in the water. In some embodiments, adsorbent is added to waste streams, mining sites, polluted waste streams, and/or fields containing water containing high levels of phosphorus in order to capture and/or remove phosphorus from the soil and/or water. Thereby, the water filtration provides a method of fertilizing plants while also maintaining the ability to enhance the quality of water and/or soil for future uses.

In some embodiments, the phosphorus adsorbent is supplied to plant media in an unloaded state with phosphorus being otherwise already present in the plant medium or being supplied separately as a phosphorus fertilizer or from another phosphorus source such as, for example, an organic material or biological agents.

In some embodiments, a solid-phase phosphorus adsorbent is supplied to plant media in order to normalize phosphorus availability in plant media. The term "plant media" is to be broadly construed, and it is understood that the term includes, but is not limited to, naturally occurring soils, soils containing additives, or mixtures thereof, and hydroponic and aeroponic media. Common examples of naturally occurring soils include, but are not limited to, sandy soils, silty soils, clay soils, peaty soils, saline soils, and loamy soils. Such soils may be found in various geological locations where plant growth may occur such as fields, gardens, and golf courses. Examples of soil additives may include inorganic soil amendments such as lime, sulfur, gypsum, perlite, and vermiculite. Common examples of hydroponic media include rockwool, lightweight expanded clay aggregates, coconut fiber/coconut chips, growstones, perlite, peat, and vermiculite.

The phosphorus adsorbent may be added to plant media before or after planting, although pre-planting application may be logistically easier. For instance, in plant media with high phosphorus concentrations due to previous heavy applications of phosphorus fertilizers and/or animal manures, or if the plant is growing slowly as a result of growth stage or environmental conditions, the solid adsorbent can take up the excess phosphorus in a sustained fashion in order to normalize the levels of phosphorus in the soil and/or facilitate normal plant growth. In addition to reducing phosphorus availability in plant media having high concentrations of phosphorus, the exchange equilibrium between the plant media and solid adsorbent can provide adequate phosphorus nutrition over time without the need for grower monitoring and sometimes without any additional phosphorus fertilization.

In another example, if the concentration of phosphorus in the plant media is optimal, the chemical equilibrium between the plant media and the phosphorus adsorbent may release more phosphorus into the soil, as the available pool of phosphorus is depleted over time from plant uptake. In this way, the release of phosphorus from the adsorbent can be proportional to the phosphorus requirement of the plant.

In regions where the nutrient holding capacity is low in the plant media, the phosphorus adsorbent can build up the total phosphorus concentration in the plant media by increasing the nutrient holding capacity and reducing leaching. Once a preferred concentration is reached, such concentration can be maintained over time in accordance with the needs of the plant. In the event that additional phosphorus is required, the adsorbent can be recharged through subsequent fertilizer application, such as, for example, using a phosphorus-containing liquid including a phosphoric acid concentration range compatible with a standard agricultural fertilization system. The phosphorus-containing liquid should remain in contact with the depleted adsorbent for a time sufficient to restore the desired phosphorus concentration to the adsorbent.

The application of phosphorus adsorbent to plant media to effect phosphorus concentration and/or phosphorus availability in plant media can be traced to the ability of the adsorbent to adsorb phosphorus onto its surface. The ability of adsorbent to chemically bind phosphorus is advantageous in various circumstances. For instance, in plant media with high concentrations of phosphorus, adsorbent can prevent phosphorus leaching by adsorbing phosphorus and thereby preventing phosphorus from leaching from the plant media. Furthermore, the adsorption of phosphorus can manipulate the levels of phosphorus in plant media which facilitates better plant growth, more specifically root growth. In plant media where a targeted concentration of phosphorus is already present, phosphorus bound to the adsorbent can slowly be desorbed and released into the plant media in a sustained fashion that is dependent on the depletion of the available pool of phosphorus within the plant media. In plant media with low concentrations of phosphorus, adsorbent can build up the concentration of phosphorus via adsorption, and once a targeted concentration is reached, such phosphorus concentration can be maintained over time in accordance with the needs of the plant through additional applications of phosphorus fertilizer.

The ability to buffer phosphorus in plant media is an advantageous aspect of the adsorbent, because manipulating phosphorus availability in plant media can promote root growth. Phosphorus is a relatively immobile nutrient in soil, meaning a root acquires phosphorus through intercepting the source. If phosphorus is overabundant and readily available in plant media, roots can easily acquire phosphorus without the roots having to extend through the plant media. However, if phosphorus availability is manipulated in such a manner that roots must extend further throughout the plant media to intercept adequate phosphorus to sustain plant growth, then a plant will expend resources for root development, leading to increased root mass, root hair development such as length and density, and/or root depth in order to intercept additional phosphorus for uptake. Increasing root growth, root mass, and/or root depth is advantageous for a plant for many reasons including, but not limited to, improved drought tolerance, increased disease tolerance, better nutrient and water acquisition, increased transplant success, increased seedling survival rates, and increased germination rates for seed. Additional benefits of manipulating phosphorus availability include plant growth regulation, such as reducing internode lengths and more uniform flowering, both of which are more desirable qualitative traits for consumers, especially for ornamental plants.

Those skilled in the art recognize the negative impacts that phosphorus leaching has on the environment. Phosphorus that drains away from the soil or other plant media has the potential to accumulate in surface waters. The accumulation of phosphorus can result in the excessive growth of algae and cyanobacteria, which leads to a decrease in available dissolved oxygen, production of harmful toxins, and eutrophication. Such conditions can be very detrimental to aquatic life.

With respect to providing targeted plant nutrition while buffering against phosphorus leaching, sandy soils and other soils with low phosphorus retention characteristics generally require more phosphorus adsorbent, while clay soils and phosphorus-saturated soils with high phosphorus retention characteristics generally require less. Therefore, adsorbent may be applied to various plant media that results in at least about: 1%, 5%, 10%, 15%, 20%, 25%, 30%, 35%, 40%, 45%, 50%, 55%, 60%, or more reduction in the level of free phosphorus in the plant media, where a proportion of adsorbent particles are of a smaller diameter. Alternatively, adsorbent may be applied to various plant media that results in at least about: 1%-5%, 1%-10%, 1%-15%, 1%-20%, 1%-25%, 1%-30%, 1%-35%, 1%-40%, 1%-45%, 1%-50%, 1%-55%, 1%-60%, 5%-10%, 5%-15%, 5%-20%, 5%-25%, 5%-30%, 5%-35%, 5%-40%, 5%-45%, 5%-50%, 5%-55%, 5%-60%, 10%-15%, 10%-20%, 10%-25%, 10%-30%, 10%-35%, 10%-40%, 10%-45%, 10%-50%, 10%-55%, 10%-60%, 15%-20%, 15%-25%, 15%-30%, 15%-35%, 15%-40%, 15%-45%, 15%-50%, 15%-55%, 15%-60%, 20%-25%, 20%-30%, 20%-35%, 20%-40%, 20%-45%, 20%-50%, 20%-55%, 20%-60%, 25%-30%, 25%-35%, 25%-40%, 25%-45%, 25%-50%, 25%-55%, 25%-60%, 30%-35%, 30%-40%, 30%-45%, 30%-50%, 30%-55%, 30%-60%, 35%-40%, 35%-45%, 35%-50%, 35%-55%, 35%-60%, 40%-45%, 40%-50%, 40%-55%, 40%-60%, 45%-50%, 45%-55%, 45%-60%, 50%-55%, 50%-60%, 55%-60% or more reduction in the level of free phosphorus in the plant media, where a proportion of adsorbent particles are of a small diameter.

The phosphorus adsorbent may be applied by distributing a known quantity of adsorbent on the surface of the plant media, followed by incorporation or mixing the adsorbent in the plant media. Distributing adsorbent to the plant media generally includes calculation of the volume of the plant media to be treated using methods known by persons skilled in the art, measuring the volume of adsorbent into an agricultural apparatus for distributing dry fertilizers, such as, for example, a broadcast spreader, and delivering the adsorbent at a calculated rate into the plant media. The amount of adsorbent required can be calculated by persons skilled in the art, and will vary depending upon the characteristics of the plant media and the needs of the species of plants. In some embodiments, methods of applying adsorbent on the surface of plant media can be beneficial to plant species including, but not limited to, marigolds, impatiens, rhododendrons, forsythias, tomatoes, common beans, chrysanthemums, turf, and/or peppers. As a result, plants can maintain increased root growth, increased water and nutrient acquisition, better drought tolerance, faster establishment and recovery, reduced nutrient leaching, higher yields, increased transplant success and survival rates, faster germination rates, and increased biomass.

It is expected that phosphorus adsorbent particles of smaller sizes, such as, for example, 1.19 mm or less in size or 0.297 mm to 1.19 mm in size, will be particularly effective in plant media that has a high concentration of phosphorus such as plant media used for growing crops where manure and fertilizer yields high amounts of phosphorus. The leaching of phosphorus is a well-known problem to those skilled in the art, and by applying smaller sizes of adsorbent particles, the increased surface area per unit weight is expected to promote more effective phosphorus adsorption. As described above, the application of the adsorbent to plant media cannot only prevent the leaching of phosphorus, but also can provide a buffer that allows phosphorus desorption to the plant if necessary.

In some embodiments, larger phosphorus adsorbent particles, such as, for example, 1.19 mm or greater in size or 1.19 mm to 2.38 mm in size, may be provided in combination with or instead of the smaller phosphorus adsorbent particles described above. Although a larger particle size has a lower surface area per unit weight such that an additional amount of phosphate adsorbent is required to provide for the same phosphorus adsorption capacity, larger particles have certain benefits over smaller particles that may warrant their inclusion. For example, larger particles of phosphorus adsorbent permit more oxygen and provide better drainage within the root zone.

Incorporation of phosphorus adsorbent into plant media can be accomplished by a variety of methods including, but not limited to, plowing, solid-tining, tilling, top-dressing, verti-cutting, dry-injecting, wet-injecting, or aerating the plant media to a desired depth using methods known to those skilled in the art. The phosphorus adsorbent can be incorporated into soil mixes, fertilizer blends, and specialty products and amendments by using methods known by those skilled in the art to ensure uniform mixing occurs. The incorporation method should evenly distribute the adsorbent throughout the volume of the plant media, preferably with the adsorbent being most prevalent in and beneath the root zone of the germinating seeds or plants. Incorporation of adsorbent also can be performed in planted crop fields using the same methods described herein to incorporate the adsorbent particles into plant media between or during growing cropping cycles, taking care not to damage the root structure of the crop. Application to plant media between growing plants can serve to buffer against phosphorus leaching and runoff from exposed plant media. Since adsorbent particles are not likely to degrade due to their low solubility, adsorbent incorporated into some plant media will remain in place for many years to continue to buffer phosphorus over time.

In some embodiments, the phosphorus adsorbent can be applied on top of or at specific depths in the plant media, including the application of adsorbent in a banded fashion and/or in various spatial positions within the plant media. The banding and/or spatial positioning at which the adsorbent is applied to the plant media allows for the adsorption of phosphorus, and as a result, the supply of phosphorus at certain depths within the plant media. The banding of adsorbent can encourage root growth in a desired plant species and/or allow for the selection of a certain plant species by placing phosphorus at a location in the root zone where certain invasive species cannot access nutrients. Therefore, by banding adsorbent at certain depths, it is possible to localize phosphorus availability at certain depths.

Figure 1:
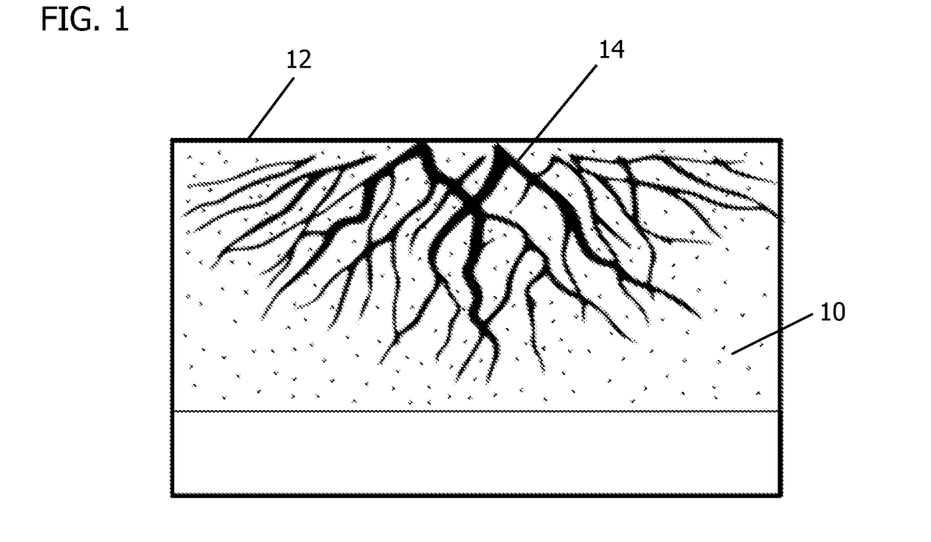
FIG. 1 shows a bonding location for the phosphorus adsorbent in an embodiment of the present disclosure.
Figure 2:
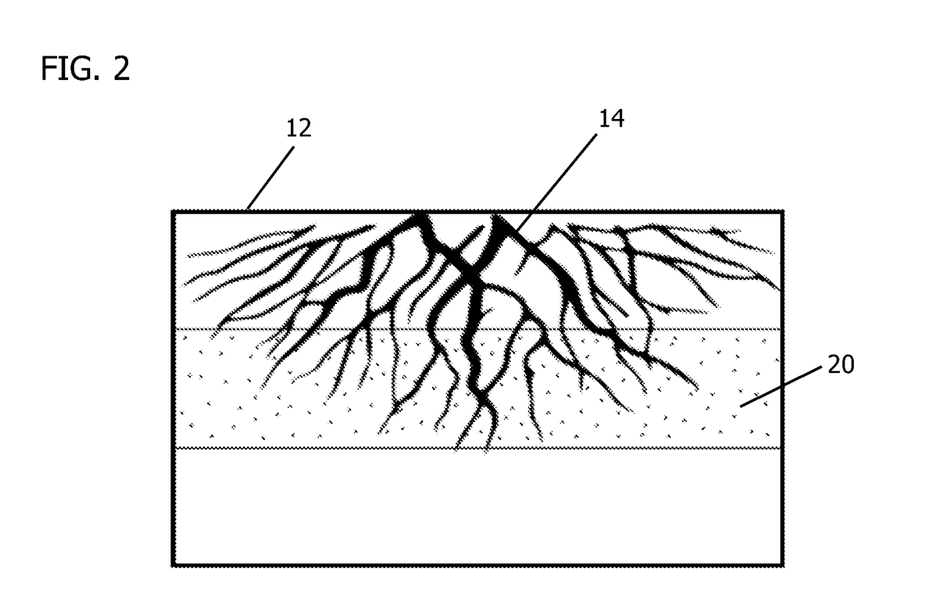
FIG. 2 shows a grow-in location for the phosphorus adsorbent in an embodiment of the present disclosure.
Figure 3:
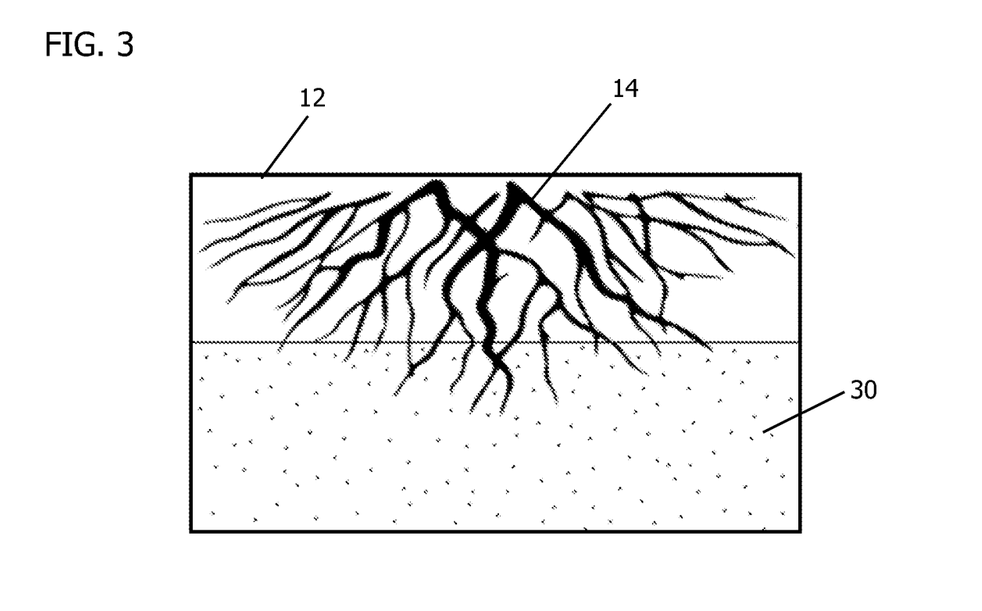
FIG. 3 shows a potting location for the phosphorus adsorbent in an embodiment of the present disclosure.

Localization of phosphorus availability can permit the localization of root growth, because root growth in many plant species can respond to phosphorus availability. Use of banding and/or spatially localized phosphorus can permit the creation of deeper rooting than conventional fertilization methods. FIG. 1 shows phosphorus adsorbent in a bonding location 10 extending from the surface 12 downward past the bottom of the root system 14. FIG. 2 shows phosphorus adsorbent in a grow-in location 20 below the surface 12 midway in the root system 14 and extending downward toward the bottom of the root system 14. Deeper rooting has multiple benefits, including increased efficiency of nutrient usage, reduced nitrate leaching, and increased plant tolerance to temperature and drought stress. FIG. 3 shows phosphorus adsorbent in a potting location 30 starting near the bottom of the root system 14 and extending farther below the surface 12 to encourage downward root growth.

Figure 4:
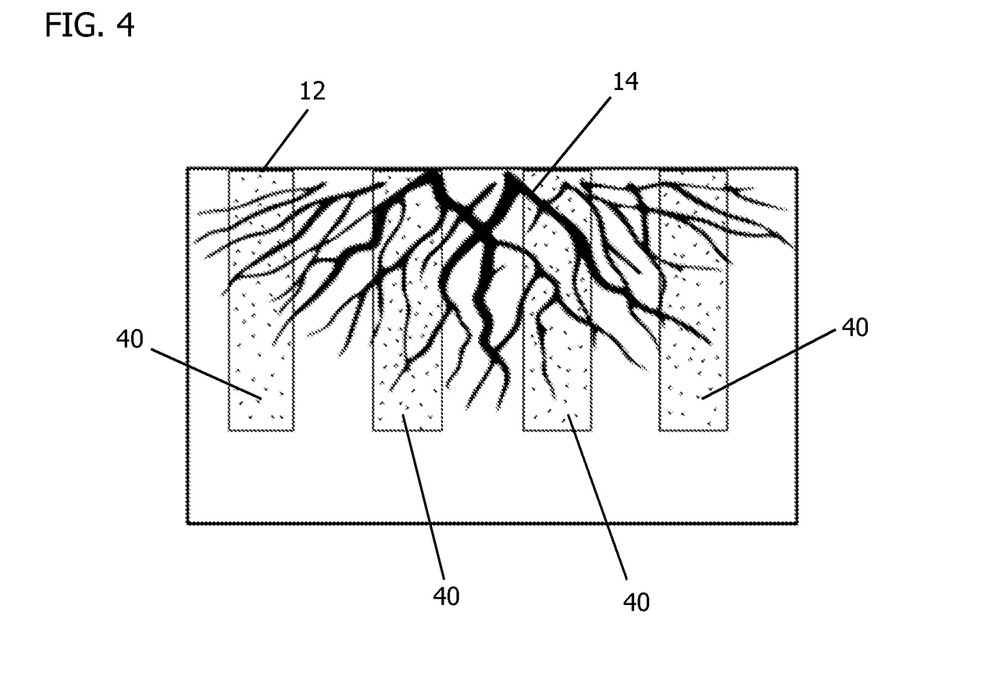
FIG. 4 shows an aeration location for the phosphorus adsorbent in an embodiment of the present disclosure.

In some embodiments, plant media can be aerated by piercing its surface to particular depths in order to create small holes of a particular tine diameter with a particular spacing. Subsequently, the phosphorus adsorbent can be applied to the holes. FIG. 4 shows phosphorus adsorbent applied to discrete aeration locations 40 extending from the surface 12 downward past the bottom of the root system 40. The holes can be made at least about: 0.5 cm, 0.75 cm, 1 cm, 5 cm, 10 cm, 15 cm, 20 cm, 25 cm, 30 cm, 35 cm, 40 cm, 45 cm, 50 cm, 55 cm, 60 cm, or deeper from the surface of the plant media. Alternatively, the aeration holes can be made in ranges in at least about: 0 cm-1 cm, 1 cm-5 cm, 1 cm-5 cm, 1 cm-15 cm, 1 cm-20 cm, 1 cm-25 cm, 1 cm-30 cm, 1 cm-35 cm, 1 cm-40 cm, 1 cm-45 cm, 1 cm-50 cm, 1 cm-55 cm, 1 cm-60 cm, 5 cm-10 cm, 5 cm-15 cm, 5 cm-20 cm, 5 cm-25 cm, 5 cm-30 cm, 5 cm-35 cm, 5 cm-40 cm, 5 cm-45 cm, 5 cm-50 cm, 5 cm-55 cm, 5 cm-60 cm, 10 cm-15 cm, 10 cm-20 cm, 10 cm-25 cm, 10 cm-30 cm, 10 cm-35 cm, 10 cm-40 cm, 10 cm-45 cm, 10 cm-50 cm, 10 cm-55 cm, 10 cm-60 cm, 15 cm-20 cm, 15 cm-25 cm, 15 cm-30 cm, 15 cm-35 cm, 15 cm-40 cm, 15 cm-45 cm, 15 cm-50 cm, 15 cm-55 cm, 15 cm-60 cm, 20 cm-25 cm, 20 cm-30 cm, 20 cm-35 cm, 20 cm-40 cm, 20 cm-45 cm, 20 cm-50 cm, 20 cm-55 cm, 20 cm-60 cm, 25 cm-30 cm, 25 cm-35 cm, 25 cm-40 cm, 25 cm-45 cm, 25 cm-50 cm, 25 cm-55 cm, 25 cm-60 cm, 30 cm-35 cm, 30 cm-40 cm, 30 cm-45 cm, 30 cm-50 cm, 30 cm-55 cm, 30 cm-60 cm, 35 cm-40 cm, 35 cm-45 cm, 35 cm-50 cm, 35 cm-55 cm, 35 cm-60 cm, 40 cm-45 cm, 40 cm-50 cm, 40 cm-55 cm, 40 cm-60 cm, 45 cm-50 cm, 45 cm-55 cm, 45 cm-60 cm, 50 cm-55 cm, 50 cm-60 cm, or 55 cm-60 cm or more in deep from the surface of the plant media. Applying adsorbent to the aeration holes may cause the holes to become closed faster, which may aid golf courses in closing aeration holes in golf greens.

Phosphorus adsorbent can be administered to plant media in a banding and/or spatial position in a least about: 0 cm, 1 cm, 5 cm, 10 cm, 15 cm, 20 cm, 25 cm, 30 cm, 35 cm, 40 cm, 45 cm, 50 cm, 55 cm, 60 cm, or deeper from the surface of the plant media. Alternatively, adsorbent can be administering to plant media in a banding and/or spatial position in at least about: 0 cm-1 cm, 1 cm-5 cm, 1 cm-5 cm, 1 cm-15 cm, 1 cm-20 cm, 1 cm-25 cm, 1 cm-30 cm, 1 cm-35 cm, 1 cm-40 cm, 1 cm-45 cm, 1 cm-50 cm, 1 cm-55 cm, 1 cm-60 cm, 5 cm-10 cm, 5 cm-15 cm, 5 cm-20 cm, 5 cm-25 cm, 5 cm-30 cm, 5 cm-35 cm, 5 cm-40 cm, 5 cm-45 cm, 5 cm-50 cm, 5 cm-55 cm, 5 cm-60 cm, 10 cm-15 cm, 10 cm-20 cm, 10 cm-25 cm, 10 cm-30 cm, 10 cm-35 cm, 10 cm-40 cm, 10 cm-45 cm, 10 cm-50 cm, 10 cm-55 cm, 10 cm-60 cm, 15 cm-20 cm, 15 cm-25 cm, 15 cm-30 cm, 15 cm-35 cm, 15 cm-40 cm, 15 cm-45 cm, 15 cm-50 cm, 15 cm-55 cm, 15 cm-60 cm, 20 cm-25 cm, 20 cm-30 cm, 20 cm-35 cm, 20 cm-40 cm, 20 cm-45 cm, 20 cm-50 cm, 20 cm-55 cm, 20 cm-60 cm, 25 cm-30 cm, 25 cm-35 cm, 25 cm-40 cm, 25 cm-45 cm, 25 cm-50 cm, 25 cm-55 cm, 25 cm-60 cm, 30 cm-35 cm, 30 cm-40 cm, 30 cm-45 cm, 30 cm-50 cm, 30 cm-55 cm, 30 cm-60 cm, 35 cm-40 cm, 35 cm-45 cm, 35 cm-50 cm, 35 cm-55 cm, 35 cm-60 cm, 40 cm-45 cm, 40 cm-50 cm, 40 cm-55 cm, 40 cm-60 cm, 45 cm-50 cm, 45 cm-55 cm, 45 cm-60 cm, 50 cm-55 cm, 50 cm-60 cm, or 55 cm-60 cm or more in deep from the surface of the plant media.

The phosphorus adsorbent can be applied to containerized plants or field-grown plants, such as, for example, grains, crops, vegetables, grasses, medical cannabis, hemp, trees, shrubs, and the like. The adsorbent can be particularly useful for greenhouse and nursery plants, ornamental propagation, vegetable and bedding transplants, and for turf used for stadium fields, sod farms, parks, golf courses, lawns, and the like, where phosphorus leaching is a particular focus of regulatory agencies. The adsorbent can be particularly useful for transplants, because it promotes increased root growth, which can improve transplant success rates.

In some embodiments, application of phosphorus adsorbent can be selected for based on its pH. The pH of the adsorbent and the growing medium, into which the adsorbent is being incorporated, affect adsorption/desorption kinetics of phosphorus. In some embodiments, the pH of the adsorbent is selected to balance the multiple factors involved in adsorbing and controlling the release of phosphorus. The adsorbent also buffers the soil pH naturally, allowing the soil to resist pH change over time. Changes to soil pH can occur for a number of reasons, including, but not limited to seasonal/weather changes, fertilizer or other product applications, or irrigation water. The ability to buffer the soil pH is an additional advantage for the adsorbent but may also be a factor in determining a preferred product pH for buffering phosphorus most efficiently and aligned with plant needs.

In some embodiments, the phosphorus adsorbent has a basic pH. For example, the phosphorus adsorbent is selected for a pH of at least about: 8.0, 8.5, 9.0, 9.5, 10.0, 10.5, 11.0 or more potential of hydrogen. Alternatively, phosphorus adsorbent can be selected for a pH of at least about: 8.0-8.5, 8.0-9.0, 8.0-9.5, 8.0-10.0, 8.0-10.5, 8.0-11.0, 8.5-9.0, 8.5-9.5, 8.5-10.0, 8.5-10.5, 8.5-11.0, 9.0-9.5, 9.0-10.0, 9.0-10.5, 9.0-11.0, 9.5-10.0, 9.5-10.5, 9.5-11.0, 10.0-10.5, 10.0-11.0, 10.5-11.0 or more potential of hydrogen. A phosphorus adsorbent with a basic pH allows adsorbed phosphorus to desorbed faster and more easily.

In some embodiments, the phosphorus adsorbent has an acidic pH. For example, the phosphorus adsorbent is selected for a pH of at most about: 6.0, 5.5, 5.0, 4.5, 4.0, 3.5, 3.0 or less potential of hydrogen. Alternatively, phosphorus adsorbent can be selected for a pH of at most about: 5.5-6.0, 5.0-6.0, 4.5-6.0, 4.0-6.0, 3.5-6.0, 3.0-6.0, 5.0-5.5, 4.5-5.5, 4.0-5.5, 3.5-5.5, 3.0-5.5, 4.5-5.0, 4.0-5.0, 3.5-5.0, 3.0-5.0, 4.0-4.5, 3.5-4.5, 3.0-4.5, 3.5-4.0, 3.0-4.0, 3.0-3.5 or more potential of hydrogen. A phosphorus adsorbent with an acidic pH allows adsorbed phosphorus to desorbed slower and less easily.

The administration of phosphorus adsorbent is not limited as a buffering agent for phosphorus. The adsorbent may act as a direct and/or indirect buffering agent for any nutrients that are necessary for plant species to grow in plant media. Nutrients that may be affected by the application of adsorbent to plant media may include, but are not limited to, nitrogen, potassium, iron, calcium, magnesium, and sulfur. The adsorbent may also buffer other micronutrient needed for plant growth, including boron, manganese, chlorine, copper, zinc, and molybdenum.

EXAMPLES

The invention is further described in the context of the following examples, which are presented by way of illustration, not of limitation.

Example 1

Activated alumina was loaded as a phosphorus adsorbent onto a column. An aqueous solution containing dissolved phosphorus at 7.87 mg/g was continuously applied to the top of the column and flowed through the column by gravity. The effluent was collected at the bottom of the column in predetermined volumes and tested for phosphorus content. Flow and collection was continuous for the first 35 liters and then stopped and the column was allowed to dry overnight. The next day, flow and collection was resumed for collection of another eight liters of effluent.

Figure 5:
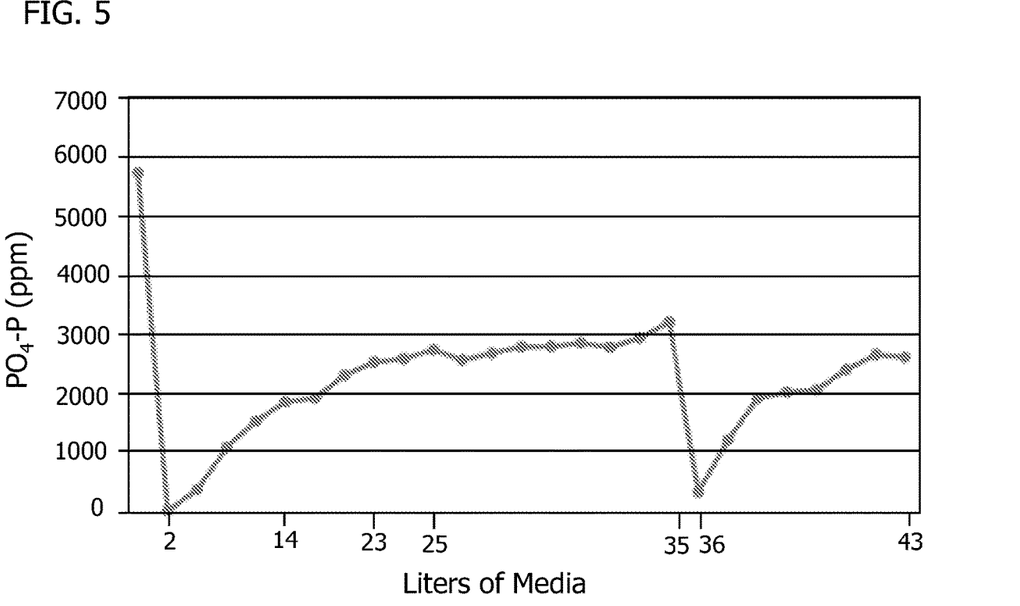
FIG. 5 shows the phosphorus level in the filtrate from before and after drying an activated alumina column.

FIG. 5 shows the measured phosphorus content in the effluent at various collection stages. From collection liter 2 to collection liter 35, the measured phosphorus content increased to over 3000 ppm. After the drying, however, the measured phosphorus content dropped down below 500 ppm before slowly increasing again. Re-exposure to the aqueous phosphorus source after drying permitted an additional adsorption loading of phosphorus beyond the initial loading capacity of the adsorbent.

Example 2

Canal water from the Everglades Agricultural Area (EAA) in southern Florida was tested as an anthropogenic source of phosphorus for collection by a phosphorus adsorbent and was compared to deionized (DI) water containing phosphorus.

Figure 6:
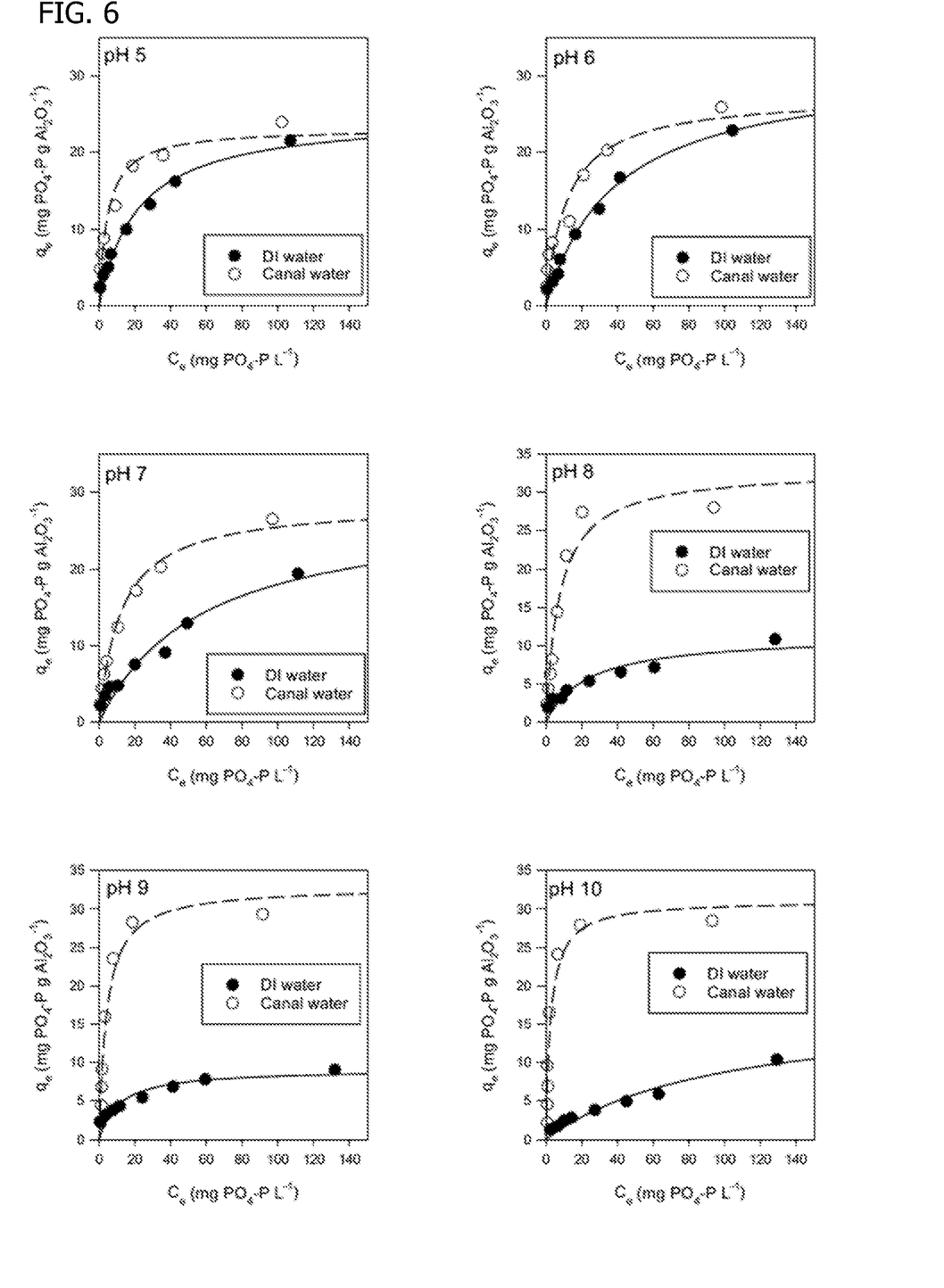
FIG. 6 shows adsorption isotherms at different equilibrium concentrations for different sample pH values.

As the pH of the sample increased, the difference in maximum adsorption capacity ($q_{max}$) becomes greater between DI and canal water, with canal water always maintaining a higher adsorption capacity than DI water. FIG. 6 shows adsorption isotherms for adsorption of phosphorus ($q_e$) by activated alumina for DI water or canal water at different equilibrium concentrations ($C_e$) for a pH of 5, 6, 7, 8, 9, or 10. It was expected that the canal water would have an inhibitory effect on P adsorption compared to DI water.

The observed opposite trend was surprising. Canal water in the EAA has a high concentration of dissolved calcium, which will co-precipitate P with $CaCO_3$ if conditions are favorable. FIG. 6, however, shows a sharp increase in the adsorption (or precipitation) of P out of solution above pH 7, indicating that at a pH above 7, alumina adsorbs phosphorus at much greater rates from canal water than DI water.

Example 3

Figure 7:
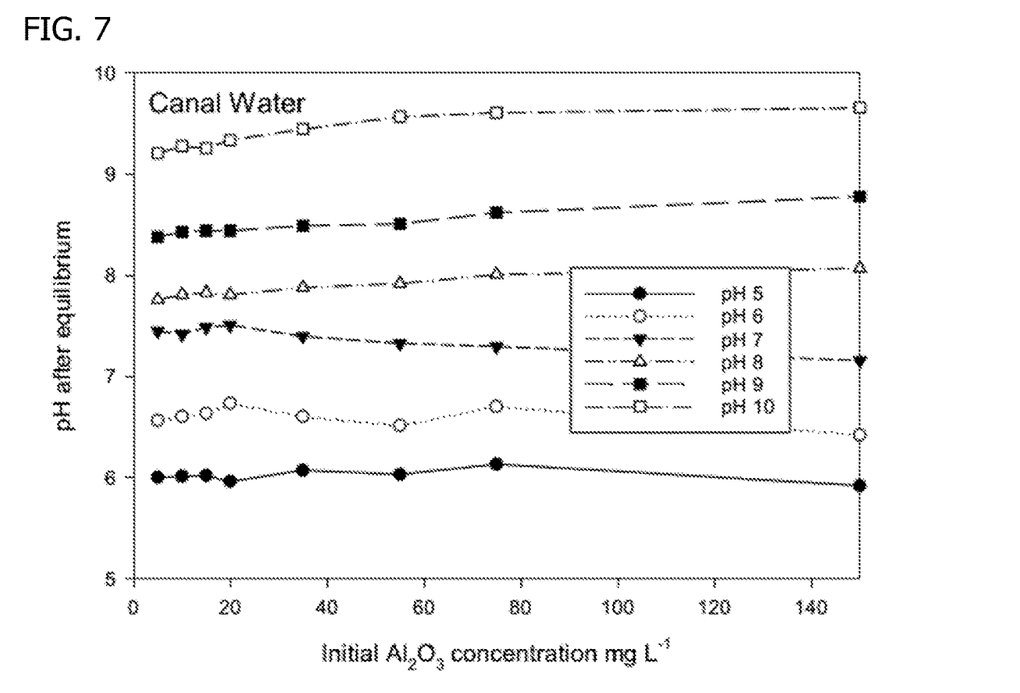
FIG. 7 shows measured solution pH following equilibrium of adsorption isotherms.

In general, all samples from both DI water and canal water tended to move towards neutrality in the presence of phosphorus adsorbent. FIG. 7 shows this trend for the canal water. This illustrates the buffering ability of phosphorus adsorbent on a system. This neutralization was more balanced for the canal water, with the three most basic soils becoming more acidic and the three most acidic soils tending towards higher pH. In the presence of moisture, aluminum oxides become hydroxylated into $Al(OH)_x$ compounds. For DI water, the more acidic treatments had the greatest change, becoming more alkaline. This trend towards alkalinity is likely due to the both the changes in protonation of phosphate species with pH, which changes the number of hydroxides ($OH^-$), which elevate pH released into solution after reaction between the phosphorus adsorbent and the phosphorus.

Example 4

The rates of adsorption and desorption of phosphorus from phosphorus adsorbent from both DI water and canal water was determined. Table 1 shows the rates of adsorption and desorption for phosphorus from DI water with alumina, at different pH values. Table 2 shows the rates of adsorption and desorption for phosphorus from canal water with alumina, at different pH values.

TABLE 1

| | D1 water | | |
| --- | --- | --- | --- |
| pH | Mass adsorbed (mg g$^{-1}$) | Mass desorbed (mg g$^{-1}$) | Percent desorbed (%) |
| 5.0 | 21.5 | 6.5 | 30.3 |
| 6.0 | 22.8 | 6.2 | 27.2 |
| 7.0 | 19.4 | 4.0 | 20.8 |
| 8.0 | 10.8 | 2.3 | 21.1 |
| 9.0 | 9.1 | 2.4 | 26.1 |
| 10.0 | 10.4 | 2.1 | 20.3 |

TABLE 2

| | Canal water | | | | | | |
| --- | --- | --- | --- | --- | --- | --- | --- |
| pH | Total mass adsorbed (mg g$^{-1}$) | Adsorbed due to Al (%) | Adsorbed due to Ca (%) | Total mass desorbed (mg g$^{-1}$) | Total desorbed (%) | Proportion of desorbed due to Al (%) | Proportion of released due to Ca (%) |
| 5.0 | 23.9 | 90.0 | 10.0 | 10.4 | 43.5 | 62.6 | 37.4 |
| 6.0 | 25.9 | 88.2 | 11.8 | 10.4 | 40.2 | 59.7 | 40.3 |
| 7.0 | 26.5 | 73.0 | 27.0 | 12.2 | 46.1 | 32.9 | 67.1 |
| 8.0 | 28.0 | 38.5 | 61.5 | 18.4 | 65.6 | 12.4 | 87.6 |
| 9.0 | 29.3 | 30.9 | 69.1 | 19.9 | 68.0 | 11.9 | 88.1 |
| 10.0 | 28.4 | 36.4 | 63.6 | 19.1 | 67.0 | 11.1 | 88.9 |

Surprisingly, a higher percentage of phosphorus adsorbed from canal water was desorbed/released compared to phosphorus adsorbed from DI water at the same pH. This indicates another advantage of phosphorus from an anthropogenic phosphorus source, as the potential for recycling is greater when loading the alumina with phosphorus from canal water compared to a DI solution.

Example 5

The effect of the location (depth) of a phosphorus adsorbent filter and the liquid flow rate on adsorption of phosphorus from canal water and lifespan of the filter were also determined.

For variable depths of the filter, a fixed input phosphorus concentration of 3.6 mg/L and a fixed flow rate of 1.0 mL/min were used. A filter depth of 6 cm took 9 days to achieve 90% exhaustion of column media, while a filter depth of 9 cm took 14 days, and a filter depth of 12 cm took 17 days. Breakthrough of phosphorus occurred at day 1 for a 6-cm filter depth, day 3 for 9-cm filter depth, and day 4 for a 12-cm filter depth. The relationship between exhaustion and bed depth seemed to be fairly consistent, with greater depths of media providing incrementally greater adsorption capacity. A 6-cm filter depth provided removal of 6.61 mg phosphorus per g of alumina, which increased to 7.32 mg phosphorus per g of alumina for 9-cm filter depth, and 8.21 mg phosphorus per g of alumina for the greatest filter depth of 12 cm.

For variable flow rates, fixed input phosphorus concentration of 3.6 mg/L and a filter depth of 9 cm were used. A flow rate of 0.5 mL/min obtained 90% exhaustion in 24 days, while it took only 17 days to obtain 90% exhaustion for a flow rate of 1.0 mL/min, and 7 days for a flow rate of 2.0 mL/min. Breakthrough of phosphorus occurred at day 9 for the 0.5 mL/min flow rate, at day 3 for 1.0 mL/min flow rate, and at day 1 for the 2.0 mL/min flow rate. The highest flow rate had the lowest adsorption of phosphorus, indicating that adsorption of soluble phosphorus may not be significant during high volume pumping in the EAA during storm events. The highest rate of phosphorus adsorption was observed from the lowest, 0.5 mL/min flow rate, at 9.36 mg/g.

Adsorption was reduced to 7.32 mg/g for the 1.0 mL/min flow rate, and 1.34 mg/g for the highest (2.0 mL/min) flow rate. At the higher flow rates there is less contact time between the phosphorus and the phosphorus adsorbent, providing less adsorption capacity. At the high flow rates, it is likely that adsorption sites are occupied by other ions before phosphorus is able to obtain the same adsorption rate found at the lower flow rates.

In summary, the deeper the filter, the longer it lasts, and the slower the water moves through it, the longer the filter lasts. Although the slower the flow rate, the longer the filter lasts, the slower flow rates resulted is a higher adsorption capacity, meaning a higher percentage of total phosphorus was removed. Lastly, the higher the concentration of phosphorus flowing through at the same rate and depth resulted in a faster exhaustion of the filter. Flow rate, depth, and concentration of phosphorus combined is important because of real world conditions where canal water would be impacted, the reason being, during storm events when phosphorus concentrations are higher, a larger proportion will be adsorbed, which may partially or fully counteract the effects of less contact time during high flow rates.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of plant fertilization comprising:
   adsorbing a first amount of phosphorus from an anthropogenic phosphorus source onto a plurality of particles of at least one phosphorus adsorbent selected from the group consisting of calcined alumina, calcined iron oxide, calcined bauxite, calcined kaolin, and combinations thereof;
   then drying the plurality of particles of at least one phosphorus adsorbent;
   then, while the first amount of phosphorous remains adsorbed on the plurality of particles of the at least one phosphorus adsorbent, adsorbing an additional amount of phosphorus from the anthropogenic phosphorus source onto the plurality of particles of at least one phosphorus adsorbent; and
   then applying the plurality of particles of at least one phosphorus adsorbent to a plant medium,
   such that both the first amount of phosphorous and the additional amount of phosphorous are simultaneously present as adsorbed onto the plurality of particles of the at least one phosphorous adsorbent prior to the applying of the plurality of particles of the at least one phosphorus adsorbent to the plant medium.

2. The process of claim 1, wherein the plurality of particles of at least one phosphorus adsorbent have an average particle size in the range of about 0.3 mm to about 4.8 mm.

3. The process of claim 2, wherein the plurality of particles of at least one phosphorus adsorbent have an average particle size in the range of about 0.3 mm to about 1.4 mm.

4. The process of claim 2, wherein the plurality of particles of at least one phosphorus adsorbent have an average particle size in the range of about 1.4 mm to about 2.4 mm.

5. The process of claim 1, wherein the first amount and the additional amount is greater than a phosphorus loading capacity of the plurality of particles without the drying.

6. The process of claim 1, wherein the anthropogenic phosphorus source is brackish, including greater than 100 parts-per-million of sodium.

7. The process of claim 6 further comprising, after adsorbing the first amount of phosphorus, rinsing the plurality of particles of at least one phosphorus adsorbent to remove salts from the plurality of particles of at least one phosphorus adsorbent while the first amount of phosphorus remains adsorbed to the plurality of particles of at least one phosphorus adsorbent.

8. The process of claim 7, wherein the rinsing the plurality of particles is prior to adsorbing the additional amount of phosphorus from the anthropogenic phosphorus source onto the plurality of particles of the at least one phosphorus adsorbent.

9. The process of claim 1, wherein the plant medium is selected from the group consisting of a naturally-occurring soil, a soil containing one or more additive, a hydroponic medium, and an aeroponic medium.

10. The process of claim 1, wherein the plurality of particles of at least one phosphorus adsorbent are disposed in a column and the first amount of phosphorous is adsorbed onto the plurality of particles by flowing the anthropogenic phosphorus source through the column and over the plurality of particles of at least one phosphorus adsorbent.

11. A process of plant fertilization comprising:
adsorbing a first amount of phosphorus from an anthropogenic phosphorus source onto a plurality of particles of at least one phosphorus adsorbent selected from the group consisting of activated alumina, activated iron oxide, activated bauxite, activated kaolin, and combinations thereof;
then drying the plurality of particles of at least one phosphorus adsorbent;
then, while the first amount of phosphorous remains adsorbed on the plurality of particles of the at least one phosphorus adsorbent, adsorbing an additional amount of phosphorus from the anthropogenic phosphorus source onto the plurality of particles of at least one phosphorus adsorbent; and
then applying the plurality of particles of at least one phosphorus adsorbent to a plant medium,
such that both the first amount of phosphorous and the additional amount of phosphorous are simultaneously present as adsorbed onto the plurality of particles of the at least one phosphorous adsorbent prior to the applying of the plurality of particles of the at least one phosphorus adsorbent to the plant medium.

12. The process of claim 11, wherein the plurality of particles of at least one phosphorus adsorbent have an average particle size in the range of about 0.3 mm to about 4.8 mm.

13. The process of claim 12, wherein the plurality of particles of at least one phosphorus adsorbent have an average particle size in the range of about 0.3 mm to about 1.4 mm.

14. The process of claim 12, wherein the plurality of particles of at least one phosphorus adsorbent have an average particle size in the range of about 1.4 mm to about 2.4 mm.

15. The process of claim 11, wherein the first amount and the additional amount is greater than a phosphorus loading capacity of the plurality of particles without the drying.

16. The process of claim 11, wherein the anthropogenic phosphorus source is brackish, including greater than 100 parts-per-million of sodium.

17. The process of claim 16 further comprising, after adsorbing the first amount of phosphorus, rinsing the plurality of particles of at least one phosphorus adsorbent to remove salts from the plurality of particles of at least one phosphorus adsorbent while the first amount of phosphorus remains adsorbed to the plurality of particles of at least one phosphorus adsorbent.

18. The process of claim 17, wherein the rinsing the plurality of particles is prior to adsorbing the additional amount of phosphorus from the anthropogenic phosphorus source onto the plurality of particles of the at least one phosphorus adsorbent.

19. The process of claim 11, wherein the plant medium is selected from the group consisting of a naturally-occurring soil, a soil containing one or more additive, a hydroponic medium, and an aeroponic medium.

20. The process of claim 11, wherein the plurality of particles of at least one phosphorus adsorbent are disposed in a column and the first amount of phosphorous is adsorbed onto the plurality of particles by flowing the anthropogenic phosphorus source through the column and over the plurality of particles of at least one phosphorus adsorbent.

* * * * *